US005220480A

United States Patent [19]

Kershaw, Jr. et al.

[11] Patent Number: 5,220,480

[45] Date of Patent: Jun. 15, 1993

[54] LOW VOLTAGE, HIGH ENERGY SURGE ARRESTER FOR SECONDARY APPLICATIONS

[75] Inventors: Stanley S. Kershaw, Jr., Portville, N.Y.; Gary L. Goedde, Racine, Wis.; Robert N. Schettler, Olean, N.Y.

[73] Assignee: Cooper Power Systems, Inc., Coraopolis, Pa.

[21] Appl. No.: 598,267

[22] Filed: Oct. 16, 1990

[51] Int. Cl.[5] .............................................. H02H 3/20

[52] U.S. Cl. ..................................... 361/117; 361/56; 361/91

[58] Field of Search .................. 361/117, 127, 56, 91, 361/126, 38-40

[56] References Cited

U.S. PATENT DOCUMENTS

| | | | |
|---|---|---|---|
| 3,778,743 | 2/1973 | Matsuoka et al. | 338/20 |
| 4,345,290 | 8/1982 | Johnson | 361/56 |
| 4,604,673 | 8/1986 | Schoendube | 361/40 |
| 4,809,124 | 3/1988 | Kresge | 361/58 |
| 4,864,456 | 9/1989 | Thuillier et al. | 361/126 |

OTHER PUBLICATIONS

General Electric Publication, "Tranquell Secondary Arrester Protect Your Electrical Equipment Against Damage by Lightning" (1983).

General Electric Publication, "Home Lightning Protector" (1972).

McGraw Edison Publication, "Surge Arresters, Storm Trapper Secondary Voltage Arresters" (1980).

*Primary Examiner*—A. D. Pellinen
*Assistant Examiner*—S. Jackson
*Attorney, Agent, or Firm*—Gregory L. Maag

[57] ABSTRACT

A surge arrester for mounting on a transformer having two line-potential terminals and a neutral terminal. The arrester includes two high energy, low voltage metal oxide varistor disks, each MOV disk having one side connected to an electrode that is electrically connected to one of the line-potential terminals and having the other side of the MOV disks electrically connected to a neutral electrode that is electrically connected to the neutral terminal of the transformer. The MOV disks shunt any current surge to ground upon the application of a predetermined voltage across the disks. In the preferred embodiment, the electrodes and MOV disks are housed within a thermoplastic elastomer housing filled with a potting compound of a resilient elastomeric material. The potting compound completely insulates and seals the electrical connections and MOV disks. Further, the materials of the housing and potting compound are resilient so as to easily vent gases formed during short circuit within the arrester and thereby prevent fragmenting.

26 Claims, 3 Drawing Sheets

LOW VOLTAGE, HIGH ENERGY SURGE ARRESTER FOR SECONDARY APPLICATIONS

BACKGROUND OF THE INVENTION

The present invention relates to electric transformers, especially distribution transformers, and to the protective equipment therefor. More particularly, the invention relates to apparatus for protecting distribution transformers from damage due to lightning induced surge currents entering the secondary windings of the transformer from the low voltage side. Still more particularly, the invention relates to a low-voltage, ruggedly constructed surge arrester of the metal oxide variety having a high energy handling capability.

Distribution transformers convert primary, high voltage levels, such as 2.4 to 34.5 KV, to secondary, low voltage levels, low voltage typically being defined as 1200 volts and less. Most typically, secondary side voltage levels of distribution transformers are 120/240 volts or 240/480 volts. Distribution transformers include primary and secondary windings which are enclosed in a protective metallic housing. A dual secondary voltage, such as 120/240 volts, is achieved by constructing the transformer secondary winding in two halves or sections. One end of each of the two winding sections is electrically joined at a predetermined point and typically grounded at this point of interconnection. In this configuration, when the transformer is energized, the voltage between the grounded interconnection point and each line potential terminal will be the same, i.e., 120 volts, and will be equal to one half the voltage between the two ungrounded ends, i.e., 240 volts.

The primary or high voltage terminals of distribution transformers are conventionally designated as the $H_1$ and $H_2$ bushings. The low voltage or secondary side line-potential terminals are designated as $X_1$ and $X_3$, while the low voltage grounded neutral bushing or terminal is designated as $X_2$.

The majority of distribution transformers are designed for pole mounting; however, some are built for pad or platform mounting. Regardless of mounting type, distribution transformers are susceptible to damage from lightning induced surges entering their windings. When a lightning surge occurs, the voltage appearing across the primary winding may exceed the insulation strength of the winding, resulting in a flashover across or through the winding insulation, thereby causing the transformer to fail. It has been conventional practice to provide overvoltage protection for distribution transformers by means of surge arresters applied to the primary, high voltage winding. More specifically, in the case of single phase distribution transformers in which both primary bushings $H_1$ and $H_2$ are at line potential, surge arresters have typically been connected between $H_1$ and ground and between $H_2$ and ground. In applications in which primary bushing $H_1$ is at line potential and $H_2$ is grounded, it is common to connect a single surge arrester between $H_1$ and grounded $H_2$. The surge arrester's function is to provide a path by which lightning induced current is diverted to ground, thus preventing flashover of the transformer's winding insulation.

Investigations have been made in recent years concerning lightning induced failures of common designs of overhead and pad mounted distribution transformers. These investigations revealed that despite the presence of state-of-the-art primary-side lightning protection as described above, many such transformer failures are attributable to lightning induced surges entering the transformer via the normally unprotected low voltage terminals, causing failure of the high voltage winding due to the induced voltages. While lightning induced currents entering the low voltage bushings are normally non-destructive, current surges over 5,000 amps are not uncommon. Secondary surges in the order of 3,000 amps can result in potentially destructive induced voltages in the primary winding which may cause the transformer to fail. Thus, it has been determined that primary side arrester protection of the high voltage winding is ineffective in preventing transformer damage due to lightning induced surge currents injected in the secondary windings.

Lightning induced surge currents can enter the low-voltage or secondary terminals of a distribution transformer in three basic ways. The first and most obvious way is due to direct lightning strikes on secondary service conductors In this case, surge currents are forced through the transformer secondary windings on their way to ground at the transformer neutral $X_2$. This mode of current surge may involve only one half, or the entire secondary winding.

A second possible mode of surge current injection into the low voltage windings of a distribution transformer is due to lightning discharge into the ground near a secondary service point. Such a discharge can cause a local elevation of ground potential resulting in ground currents flowing outward from the discharge point back toward the transformer's grounded neutral $X_2$. Some of this current can flow through the transformer secondary windings via the grounded transformer neutral resulting in a low-side current surge.

The third way that surge currents enter low-voltage windings may be less obvious than the others, but is perhaps the most common in occurrence. Lightning strikes to overhead primary-side phase conductors are conducted to ground at the service pole supporting the transformer by a ground wire running down the pole. The surge arrester connected to the primary winding of the distribution transformer forms one path for the surge from the phase conductor to flow to this ground connection. Where there is an overhead neutral conductor, it is connected directly to the pole ground. Since the transformer neutral $X_2$ is also connected to this ground wire, part of the current discharged by the primary side surge arrester can be diverted into the secondary windings of the transformer via the secondary side.

In each of the last two cases, surge current may enter the grounded neutral terminal $X_2$ of the low-voltage winding and divide through the two halves of the winding, exiting by way of secondary line terminals $X_1$ or $X_3$, or both. For such current to flow through the transformer, there must be a path through the customer load or customer meter gaps, or across gaps in the customer's wiring. Where such a path exists, the amount of surge current conducted through the transformer secondary windings will be dependent both on the amount of customer load connected at the time of the surge and, more significantly, on the ratio of the resistance of the pole ground to the resistance of the customer ground. If the pole ground has a resistance less than that of the customer ground, the current level within the transformer should be well below that required to produce an insulation failure within the windings.

Three-wire surge injection occurs where surge current enters the transformer through $X_2$ and departs from the transformer through both $X_1$ and $X_3$. Two-wire surge injection occurs in two situations. First, it may occur when the surge enters the transformer through $X_2$ and departs from the transformer through either $X_1$ or $X_3$. This can occur when only one customer meter gap fires, or when the load on the service conductor connected to $X_1$ is substantially different from that on $X_3$. Two-wire injection may also occur when a surge enters either $X_1$ or $X_3$ and exits to ground through $X_2$.

Depending upon their design, distribution transformers tend to be particularly affected by certain types of surges. More specifically, transformers having uncompensated winding constructions, i.e., non-interlaced low voltage windings, are particularly affected by both three-wire and two-wire surge injection. Transformers having compensated winding constructions, i.e., interlaced low voltage windings, are only affected by two-wire surge injection. The majority of modern day distribution transformers have non-interlaced low voltage windings, and thus are particularly susceptible to damage from both three-wire and two-wire surge injection.

In an effort to protect distribution transformers from such secondary-side surges, various schemes have been employed. First, constructing the transformers with interlaced secondary windings provides good protection from three-wire surges, but, as explained above, two of the most common types of secondary surges result in two-wire surge injection and interlaced windings offer no protection from such surges. Further, transformers having interlaced windings also are more expensive than those with non-interlaced windings.

Alternatively, or additionally, extra primary winding insulation may be added to provide some protection from both two and three-wire surge injection. This technique is relatively expensive, however, and does not prevent surges from entering the transformer, but merely serves to raise the damage threshold level of the transformer.

Recently, surge arresters of the metal oxide varistor (MOV) type have been applied between secondary-side phase terminals, $X_1$ and $X_3$, and the grounded neutral terminal, $X_2$. MOV disks are variable resistors which provide either a high or a low impedance current path through the disk's body depending on the voltage that appears across the MOV disk. More specifically, at the power system's steady state or normal operating voltage, the MOV disk has a relatively high impedance. As the applied voltage is increased, gradually or abruptly, the impedance of the MOV disk progressively decreases until the voltage appearing across the disk reaches the disk's "breakdown" or "turn-on" voltage, at which point the disk's impedance dramatically decreases and the disk becomes highly conductive. Accordingly, if the arrester is subjected to an abnormally high transient over-voltage, such as may result from a lightning strike or power frequency overvoltage, the MOV disk becomes highly conductive and serves to conduct the resulting transient current to ground. As the transient over-voltage and resultant current dissipate, the MOV disk's impedance once again increases, restoring the arrester and the electrical system to their normal, steady state condition.

MOV type secondary surge arresters have been shown to provide adequate two and three wire surge protection for low energy surges of, for example, 10,000 amps or less. Some manufacturers of such arresters claim their arresters are capable of safely dissipating surges of 20,000 amps. However, to date, such MOV secondary arresters have not had the even higher energy discharge capability desirable. Further, state-of-the-art MOV secondary surge arresters are expensive to manufacture due to the precise machining and collaring that is currently required on the MOV disks.

Accordingly, there remains a need in the industry for a low voltage surge arrester capable of protecting a distribution transformer from damage or destruction caused by surge currents that are injected into the secondary windings. Preferably, such an arrester would be effective against short duration surges of 40,000 amps, would be weatherproof and durable, and be of a rugged low cost construction. Such an arrester that could be employed in under oil applications would also be desirable.

Other objects and advantages of the present invention will become apparent from the following description.

SUMMARY OF THE INVENTION

The surge arrester of the present invention for the secondary side of a transformer includes two high energy, low voltage metal oxide varistor disks for conducting current surges to ground upon a predetermined voltage applied across the disks. The line potential terminals on the secondary side of the transformer are electrically connected to one side of each of the MOV disks with the neutral terminal being electrically connected to the opposing side of each of the two MOV disks. The electrical connections between the electrodes and MOV disks are surrounded with an insulative (potting or encapsulating) material to prevent flashover. In the preferred embodiment, the housing for the electrodes and MOV disks is made of a thermoplastic elastomer and is filled with a potting compound of a resilient elastomeric material. The potting compound completely seals the electrical connections between the lead wires and the electrodes. The surge arrester is non-fragmenting. The material of the potting compound and housing are resilient so as to facilitate the venting of gases formed within the surge arrester during a short circuit and thereby prevent the arrester from fragmenting. The potting compound eliminates the need for an epoxy or ceramic collar around the MOV disks. The MOV disks have the further advantage of being small, yet having sufficient cross-sectional area and thickness to handle high energy and conduct current at lower voltage. The electrodes have contact points which obviate the need for a fine surface finish on the MOV disks.

BRIEF DESCRIPTION OF THE DRAWINGS

For a detailed description of a preferred embodiment of the invention, reference will now be made to the accompanying drawings wherein.

DESCRIPTION OF THE PREFERRED EMBODIMENT

Figure 1:
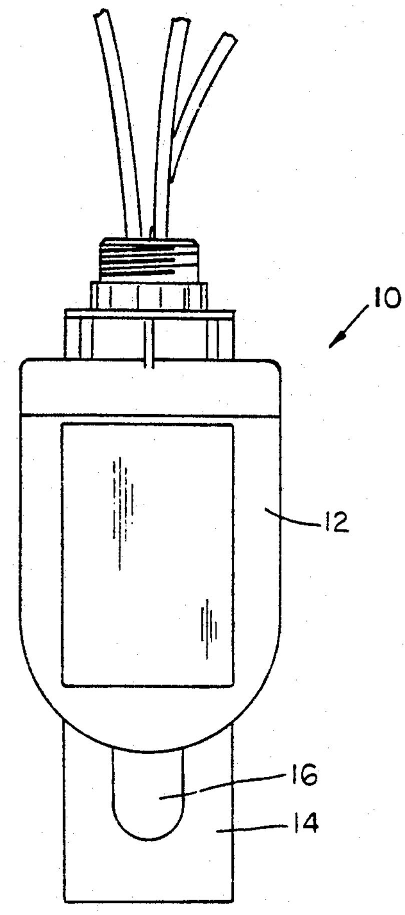
FIG. 1 shows a top plan view of the surge arrester of the present invention.
Figure 2:
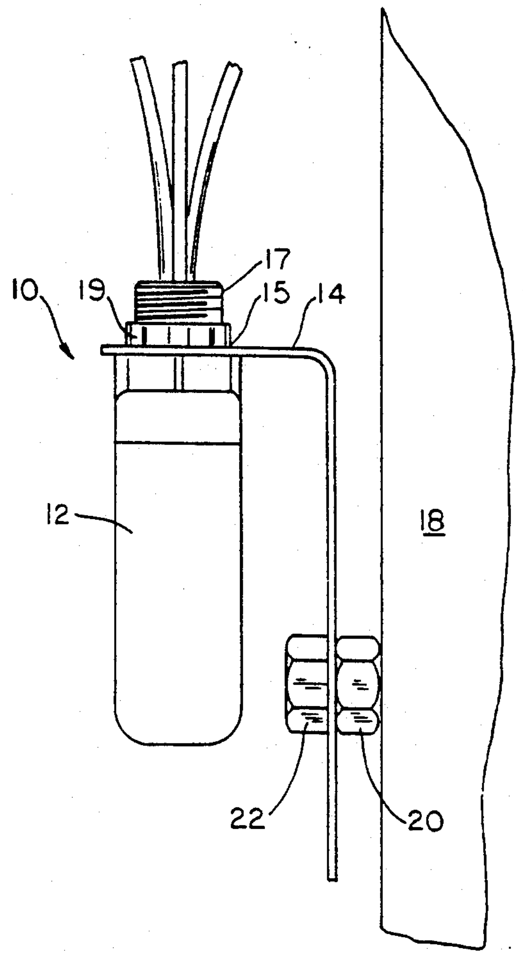
FIG. 2 shows a side elevation view of the surge arrester shown in FIG. 1.

Referring initially to FIGS. 1 and 2, there is shown a low voltage, high energy surge arrester 10 for transformer secondary side applications. Arrester 10 generally comprises a body portion 12 mounted on a mounting bracket 14. Bracket 14 includes an aperture 15 at one end for receiving a threaded terminal end 17 of body portion 12. A nut 19 secures body portion 12 to bracket 14. As best shown in FIG. 1, bracket 14 also includes a lower mounting slot 16. Arrester 10 is mounted on the exterior wall of distribution transformer 18 by bolt 22 which is disposed through slot 16 and threaded into ground pad 20 on transformer 18.

Figure 3:
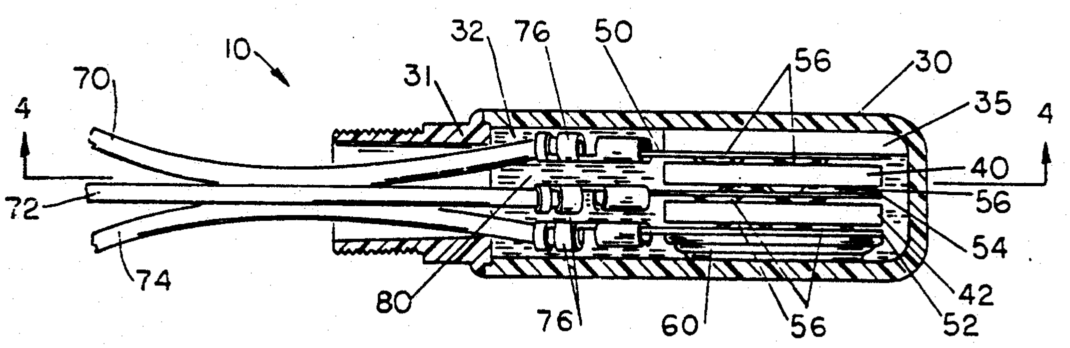
FIG. 3 shows a cross-sectional view in elevation of the surge arrester shown in FIG. 1.
Figure 4:
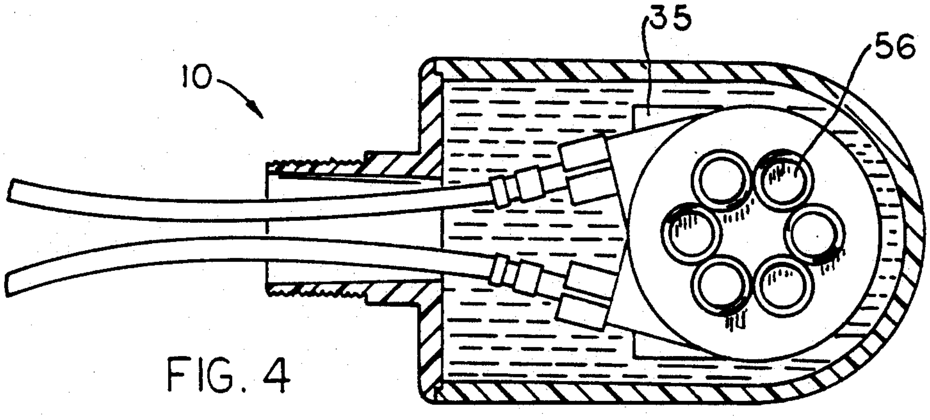
FIG. 4 shows a cross sectional view taken along line 4—4 in FIG. 3.

Referring now to FIGS. 2 and 3, body portion 12 comprises an insulative housing 30 having an internal cavity 32. Stacked in series relationship within cavity 32 are low voltage, high energy varistors 40 and 42, electrodes 50, 52 and 54 and spring 60. As explained in more detail below, conductors 70, 72 and 74 extend from cavity 32 and electrically connect arrester 10 to the equipment it is intended to protect, such as transformer 18 (FIG. 2).

Body portion 12 is made from a thermoplastic elastomer such as Noryl manufactured by the General Electric Company. Body portion 12 includes a snap-on cap 31 which is releasably connected to the main body portion 30 and includes threaded terminal end 17. The body portion 12 provides a waterproof enclosure for protecting the disks and electrodes. Further, it is rust and corrosion proof and resists environmental damage caused by temperature extremes.

Low voltage, high energy varistors 40 and 42 are metal oxide (MOV) disks capable of withstanding high energy surge currents. The material for the MOV disks may be of the same material used for any high energy high voltage disk, and are preferably made of formulations of zinc oxide. See, for example, U.S. Pat. No. 3,778,743 of the Matsushita Electric Industrial Co., Ltd., Osaka, Japan, incorporated herein by reference.

Varistors 40, 42 are high energy, low voltage disks capable of conducting lightning currents up to 40,000 amps. High energy MOV disks are capable of discharging the high surge currents caused by lightning and then thermally recovering so as to be capable of enduring repetitive high surge currents. The high energy MOV disks have a non-linear impedance in that initially the MOV disks require a threshold voltage to conduct current, which, after being reached, causes the impedance of the MOV disks to decrease thereby enhancing current conductivity. It is desirable, as previously indicated, for the MOV disks to thermally recover from a high energy surge current while energized at the power system's maximum continuous operating voltage (MCOV).

The high energy MOV disks of the present invention are capable of conducting lightning surge currents up to 40,000 amps. The MOV disks of the present invention will recover from a 40,000 amp surge current of a short duration such as a 4/10 wave (4 microseconds to crest and decaying to half crest in 10 microseconds). Prior art MOV disks for secondary surge arresters generally are only capable of conducting 10,000 amps of surge current. See U.S. Pat. No. 4,809,124 of the General Electric Company for a high-energy, low-voltage surge arrester, incorporated herein by reference. Often, prior art MOV disks are not used as high energy surge arresters on the secondary side, but are only used for relatively low energy surge protection.

The MOV disks improve the discharge voltage over other types of surge arresters such as the gapped-silicon carbide arrester. The voltage ratings of the MOV disks of the present invention, ranges from 120 volts to 650 volts. A typical transformer will utilize an arrester having a 400 volt MCOV rating.

Varistors 40 and 42 are preferably round disks but may be of any shape. The size of the conductive surface area of the MOV disks 40, 42 will dictate its durability and recoverability from high surge currents It is preferred that the circular cross-section of the disk of the present invention have a diameter between 0.75 and 1.65 inches to ensure that there is sufficient surface area of between 0.44 and 2.14 square inches to maintain disk durability and recoverability. A 1.5 inch diameter is most preferred. It is also preferred that the MOV disk be as small as possible to reduce the size of the arrester. However, as size is reduced, thereby reducing the surface area, the durability and recoverability of the disk is decreased. MOV disks of this size are not typically used in secondary applications, and provide for a higher energy handling capability than conventional MOV secondary arresters.

With a consistent microstructure, the thickness of the MOV disk determines the operating voltage level. The preferred range of thickness of MOV disks 40, 42 is 0.05 to 0.25 inches.

Each end of MOV disks 40, 42 is sprayed with a coating of molten aluminum to provide a metallized surface. This surface ensures good electrical contact and thus good conductivity between electrodes 50, 52, 54 and MOV disks 40, 42.

Electrodes 50, 52 are line-potential electrodes while electrode 54 is the common or neutral electrode. Electrodes 50, 52, and 54 are made of brass and/or copper or other similar conducting material. Electrodes 50, 52, and 54 each have preferably three raised portions 56 having a circular cross-section with a preferred diameter of approximately 0.2 inches. The three raised portions 56 provide a three-point electrical contact with the surface of MOV disks 40, 42 so as to ensure electrical conductivity. MOV disks having a thickness of 0.05 to 0.25 inches are delicate and difficult to machine. Therefore, it is difficult to achieve a high surface finish so as to achieve a flat planar surface-to-surface contact with a flat electrode. The three-point dimpled contact provided by raised portions 56 with the metallized surface of MOV disks 40 and 42 ensures that electrical contact will be achieved without regard to surface finish. Further, disk warpage and disk distortion are possible during the sintering of the MOV disks. Also, manufacturing cost savings may be achieved by eliminating the necessary grinding or surface processing of the MOV disks which would otherwise be necessary to achieve the required surface finish for appropriate electric contact.

Common electrode 54 is electrically connected to conductor 72 by a crimp type electrical connector 76.

Electrodes 50 and 52 are electrically connected to conductor 70 and 74, respectively, by similar electrical connectors 76. Electrodes 50 and 52 are positioned within cavity 32 against MOV disks 40, 42. Electrodes 50, 52, and 54 are stacked with MOV disks 40, 42 within cavity 32. The line potential electrodes 50, 52 are positioned on the outside abutting MOV disks 40, 42 with common electrode 54 being positioned between MOV disks 40, 42. Electrodes 50 and 52 have raised portions 56 facing and engaging MOV disks 40, 42, respectively, and common electrode 54 has raised portions 56 on both sides engaging MOV disks 40 and 42.

Housing 30 includes two interior horizontal molded bars 35 (FIG. 3) to engage and support the stack of electrodes and MOV disks within housing 30. Spring 60 is positioned between housing 30 and electrode 52 to impart a compressive force on the stack of MOV disks and electrodes against bars 35 so as to ensure that proper electrical connection is maintained between the electrodes and MOV disks.

The cavity 32 of housing 30 is filled with a potting compound 80 of a resilient elastomeric material, such as a silicon rubber compound. Potting compound 80 fully seals the inner components of the surge arrester 10 from moisture and thereby provides a waterproof environment for the electrodes and MOV disks. The potting compound 80 further insulates the electrodes and MOV disks within housing 30 thereby providing an insulating barrier around the internal components. The potting compound is a dielectric which prevents flashover within the housing 30 of surge arrester 10. Because the potting compound 80 completely surrounds, seals, and insulates the electrodes and disks. MOV disks 40, 42 may be collarless, and in the preferred embodiment are collarless. The high energy MOV disks of the prior art always required either ceramic or epoxy collars to act as a dielectric and prevent flashovers. The elimination of the collar on the MOV disks provides a substantial advantage to the exterior mount surge arrester 10 of the present invention. While the potting compound is preferably of silicon rubber, it may also be a urethane or epoxy compound.

The externally mounted surge arrester 10 is non-fragmenting. Most prior art arresters are made of a brittle material such as porcelain. If the disks develop a short circuit, the normal 60 hertz power current will pass through the disks to ground causing arcing. The arcing will generate internal pressure which may otherwise cause the arrester to rupture violently. However, in the present invention, since both the housing 30 and potting compound 80 are made of an elastomeric material, the housing 30 and potting compound 80 are resilient thus greatly reducing the possibility of a violent rupture. With the present invention, an internal fault will normally only create a hole through the side of the surge arrester 10 through which the internally-generated gases are vented, and the surge arrester will not fragment as does the prior art.

Figure 5:
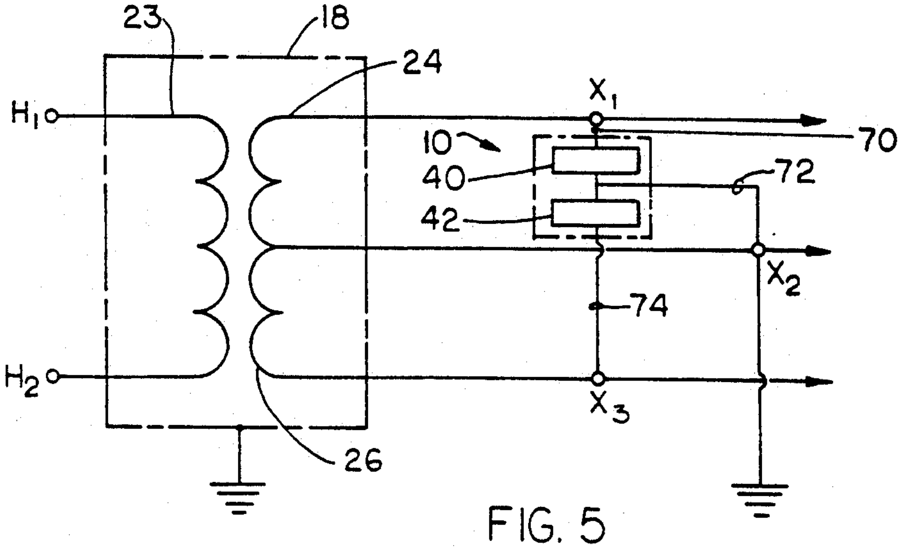
FIG. 5 shows a schematic circuit diagram of the surge arrester shown in FIG. 1 applied to the secondary side of a distribution transformer.

Referring now to FIG. 3 and FIG. 5, conductor 72 electrically connects common electrode 54 to the secondary neutral $X_2$ of the distribution transformer 18. Similarly, conductors 70 and 74 electrically connect electrodes 50 and 52, respectively, to terminals $X_1$ and $X_3$ of the transformer secondary. Typically, the voltage between terminals $X_1$ and neutral $X_2$ and between $X_3$ and $X_2$ is nominally 120 volts.

The operation of surge arrester 10 is best explained with reference to FIG. 5. Referring now to FIG. 5, transformer 18 includes high voltage or primary bushings $H_1$ and $H_2$, low voltage line potential bushings $X_1$ and $X_3$, and neutral bushing $X_2$. Transformer 18 includes a primary winding 23 and two secondary winding sections, 24, 26, one end of each section 24, 26 being interconnected and grounded through neutral bushing $X_2$. The ungrounded ends of secondary winding sections 24, 26 are connected to line potential bushings $X_1$ and $X_3$, respectively.

In operation, when primary winding 23 of transformer 18 is energized, a designed potential difference is created between secondary neutral terminal $X_2$ and line potential terminals $X_1$ and $X_3$, such potential difference typically is equal to the nominal voltage of 120 volts. When a surge current occurs on the low-voltage or secondary windings 24, 26, as may typically occur due to a lightning strike, for example, a transient over-voltage is induced which will appear between terminals $X_1$ or $X_3$ (or both) and grounded neutral terminal $X_2$. This will induce an over-voltage condition of proportionately greater magnitude within primary winding 23 which, if allowed to persist, could damage or destroy the transformer. If the secondary side transient voltage is sufficiently high, the MOV disks 40, 42 become highly conductive and serve to conduct the resulting transient current to ground, shunting the potentially damaging current around the secondary windings 24, 26. As the transient over-voltage and resulting current dissipate, the MOV disk's impedance once again increases, restoring the arrester 10 and the electrical system to the normal, steady state condition.

The arrester 10 has a 5-KA Duty cycle rating and a 40-KA High-Current-Short-Duration capability. The discharge characteristics of arrester 10 are shown in the table below:

| Rating | MCOV | Maximum Discharge Voltage - kV crest 8/20 us Current Wave | | | | |
|---|---|---|---|---|---|---|
| V rms | V rms | 1.5 kA | 5 kA | 10 kA | 20 kA | 40 kA |
| 480 | 400 | 1.7 | 1.9 | 2.1 | 2.4 | 2.9 |

In addition to being installed at the secondary of a distribution transformer 18, arrester 10 may be installed adjacent to other low voltage electrical apparatus, such as motors, pumps, and compressors or at the service entrance of a residential or commercial building.

Figure 6:
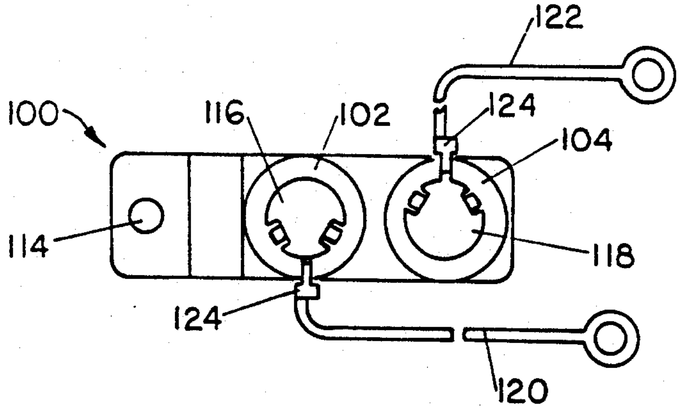
FIG. 6 shows a plan view of an alternative embodiment of the surge arrester shown in FIG. 1 adapted for under oil applications.
Figure 7:
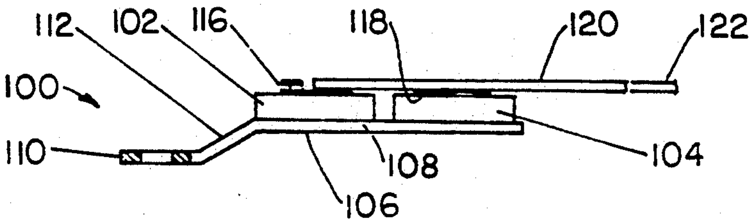
FIG. 7 shows a side elevation view of the surge arrester shown in FIG. 6.
Figure 8:
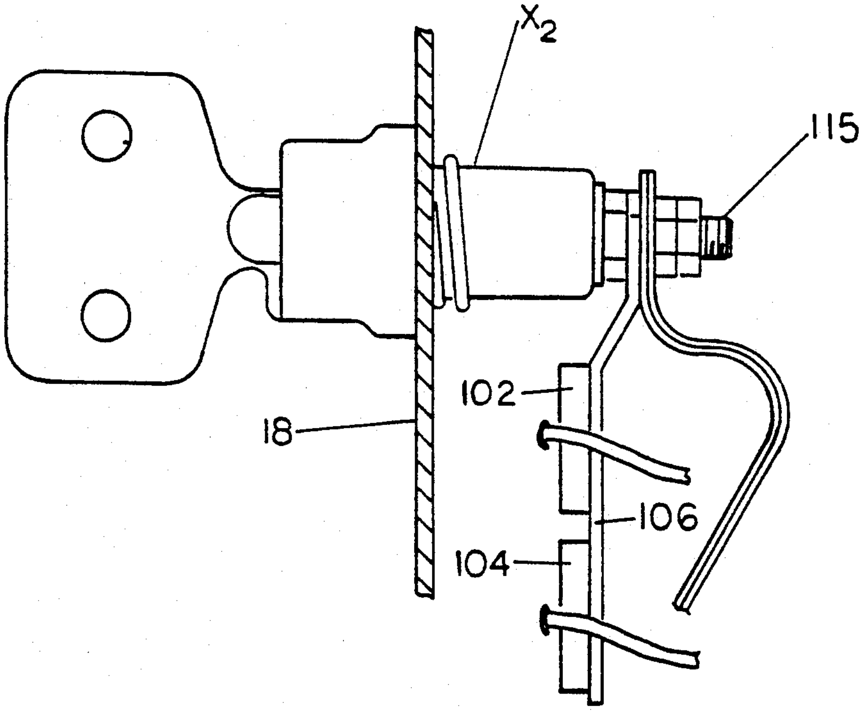
FIG. 8 shows a side elevation view of the surge arrester of FIGS. 6 and 7 mounted inside a oil filled distribution transformer.

FIGS. 6 through 8 show an alternative embodiment of the present invention that is especially adapted for installation within the transformer, such as inside an oil-filled distribution transformer 18. As shown in FIGS. 6 and 7, internally mounted surge arrester 100 includes a conducting plate 106 and MOV disks 102 and 104. The disks 102, 104 of the alternative embodiment are the same as disks 40, 42 of the preferred embodiment except that dielectric collars are required unless the arrester 100 is encapsulated by an insulating compound. Disks 102 and 104 are preferably formed of zinc oxide, are generally cylindrical in shape and have the dimensions of disks 40, 42 of the preferred embodiment.

Conducting plate 106, which is preferably made of aluminum or other conducting material, includes two generally parallel portions 108 and 110, connected by an offset segment 112. Formed through portion 110 is a mounting aperture 114. When installed, plate 106 is electrically connected to the neutral terminal $X_2$. The bushing stud 115 of terminal $X_2$ is disposed through aperture 114 in plate 106. Conductor 120 is electrically connected to electrode 116 by crimp type and/or solder connection 124 while conductor 122 is similarly connected to electrode 118 by connection 124. It is preferred that the connection 124 be made first by crimping and then by soldering. Conductors 120 and 122 are also electrically connected to the transformer secondary terminals $X_1$ and $X_3$.

MOV disks 102, 104 are affixed to conducting plate 106 and electrodes 116, 118 by a conductive adhesive or epoxy. It is preferred that a silver-filled epoxy be used, although other metal-filled epoxies would also be satisfactory.

As shown in FIG. 8, the internally mounted surge arrester 100 is mounted on the interior of the transformer. Although it is recommended that the surge arrester be submerged in the oil contained in the transformer, such submerging is not required. The internally mounted surge arrester 100 may be mounted within the air environment within the transformer so long as moisture and pollutant contamination is prevented from getting inside the transformer. The potting compound 80 of the preferred embodiment is unnecessary because the surge arrester 100 is mounted inside the transformer. Either the transformer oil or internal atmosphere (air or nitrogen) surrounds the surge arrester 100 and thus provides the appropriate insulation. I this embodiment, conducting plate 106 serves the same functions as common electrode 54 and conductor 72 previously described. Arrester 100 has the same duty rating, energy handling capability and discharge characteristics as described above with respect to arrester 10.

While preferred embodiments of the invention have bee shown and described, modifications thereof can be made by one skilled in the art without departing from the spirit of the invention. The embodiments described herein are exemplary only and are not limiting. Many variations and modifications of the apparatus described herein are possible and are within the scope of the invention. Accordingly, the scope of protection is not limited by the description presented above, but is only limited by the claims which follow, that scope including all equivalents of the subject mater of the claims.

What is claimed is:

1. A surge arrester for mounting on the exterior of a transformer having first and second line-potential terminals and a neutral terminal, comprising:

first and second electrodes electrically connected to the first and second line-potential terminals, respectively;

a neutral electrode electrically connected to the neutral terminal, said first, second, and neutral electrodes comprising conducting plates;

a first metal oxide varistor having a first facing surface in electrical and physical engagement with said first electrode and having a second facing surface in electrical and physical engagement with said neutral electrode;

a second metal oxide varistor having a first facing surface in electrical and physical engagement with said second electrode and having a second facing surface in electrical and physical engagement with said neutral electrode;

said first and second metal oxide varistors having a High-Current-Short-duration capability of approximately 40 KA or more; and an insulative material surrounding said electrodes and said metal oxide varistors.

2. The surge arrester of claim 1 wherein said insulative material comprises an elastomeric potting compound, and wherein said surge arrester further comprises an elastomeric, non fragmenting enclosure for housing said varistors and said electrodes, and said elastomeric potting compound and elastomeric enclosure permitting gasses, internally generated during an arrester failure, to be safely vented outside the arrester.

3. The surge arrester of claim 2 wherein said metal oxide varistors are collarless.

4. A surge arrester comprising:

an insulative housing;

a first metal oxide varistor in said housing, said varistor having a first facing surface in electrical and physical contact with a common electrode and a second facing surface in electrical and physical contact with a first outer electrode;

a second metal oxide varistor in said housing, said varistor having a first facing surface in electrical and physical contact with said common electrode and a second facing surface in electrical and physical contact with a second outer electrode, said outer electrodes and said common electrode comprising conducting plates;

spring means in said housing for imparting a compressive force against said varistors and said electrodes;

conductors electrically connected to each of said electrodes and extending outside of said housing; and potting compound surrounding said metal oxide varistors and said electrodes in said housing.

5. The surge arrester of claim 4 wherein said metal oxide varistors are collarless.

6. The surge arrester of claim 4 wherein each of said facing surfaces of said varistors has a surface area between 0.44 and 2.14 square inches and wherein said varistors have a High-Current-Short-duration capability of approximately 40 Ka or more.

7. The surge arrester of claim 6 wherein said varistors have a height between 0.05 and 0.25 inches.

8. A surge arrester comprising:

an insulative housing;

a first metal oxide varistor in said housing, said varistor having a first facing surface in electrical contact with a common electrode and a second facing surface in electrical contact with a first outer electrode;

a second metal oxide varistor in said housing, said varistor having a fist facing surface in electrical contact with said common electrode and a second facing surface in electrical contact with a second outer electrode;

spring means in said housing for imparting a compressive force against said varistors and said electrodes;

conductors electrically connected to each of said electrodes en extending outside of said housing;

potting compound surrounding said metal oxide varistors and said electrodes in said housing; and wherein said electrodes include raised portions forming electrical contacts for making electrical contact with said varistors.

9. The surge arrester of claim 8 wherein said raised portions are generally circular in cross section and have a diameter of approximately 0.2 inches.

10. The surge arrester of claim 8 wherein at least one of said electrodes has three raised portions in electrical and physical contact with one of said metal oxide varistors.

11. The surge arrester of claim 10 wherein each of said three raised portions is substantially equidistant from the other two of said raised portions whereby said three raised portions are formed on said electrode in the pattern of an equilateral triangle.

12. The surge arrester of claim 8 wherein each of said electrodes have three raised portions on each varistor-contacting surface.

13. The surge arrester of claim 4 wherein said potting compound is a resilient elastomeric material.

14. The surge arrester of claim 13 wherein said resilient elastomeric material is a silicon rubber compound.

15. The surge arrester of claim 13 wherein said resilient elastomeric material is a urethane compound.

16. The surge arrester of claim 13 wherein said resilient elastomeric material is an epoxy compound.

17. The surge arrester of claim 12 wherein said housing is made of a thermoplastic elastomer.

18. A surge arrester for mounting inside a transformer enclosure on the neutral bushing stud, said arrester comprising:

a plate formed of conducting material;

a pair of metal oxide varistor disks, each of said disks having a first surface electrically connected to said conducting plate and a second surface facing away from said plate;

a pair of electrical contacts, each of said pair of contacts being electrically connected to said second surface of a different one of said metal side varistor disks;

an aperture formed through said conducting plate and disposed about the neutral bushing stud; and a pair of conductors, each of said pair being electrically connected to a different one of said electrical contacts.

19. The surge arrester of claim 18 wherein said varistor disks have a High-Current-Short-duration capability greater than 20,000 amps.

20. The surge arrester of claim 19 wherein said varistor disks have a High-Current-Short-Duration capability of at least approximately 40 KA.

21. The surge arrester of claim 18 wherein said varistor disks are affixed to said plate by a conductive adhesive.

22. The surge arrester of claim 21 wherein said adhesive comprises a metal-filled epoxy.

23. The surge arrester of claim 18 wherein said varistor disks have a thickness of between 0.05 and 0.25 inches.

24. The surge arrester of claim 23 wherein said varistor disks have cross sectional areas of between 0.44 and 2.14 square inches.

25. The surge arrester of claim 21 wherein said varistor disks have a High-Current-Short-Duration capability of at least approximately 10KA.

26. A surge arrester comprising:

an insulative housing;

a first metal oxide varistor in said housing, said varistor having a first facing surface in electrical and physical contact with a common electrode and a second facing surface in electrical and physical contact with a first outer electrode;

a second metal oxide varistor in said housing, said varistor having a first facing surface in electrical and physical contact with said common electrode and a second facing surface in electrical and physical contact with a second outer electrode;

spring means in said housing for imparting a compressive force against said varistors and said electrodes;

conductors electrically connected to each of said electrodes and extending outside of said housing;

potting compound surrounding said metal oxide varistors and said electrodes in said housing; and wherein said common electrode includes three raised portions arranged in a triangular pattern for making electrical contact with said first metal oxide varistor and three raised portions arranged in a triangular pattern for making electrical contact with said second metal oxide varistor, said raised portions being formed substantially equidistant from the center of said common electrode.

* * * * *